3,702,298
METHOD OF DISINFECTING WITH DIVALENT
AND TRIVALENT METAL GERMICIDE
Frank J. Zsoldos, Jr., Denville, and Anna Kowalski,
Rockaway, N.J., assignors to Eco Sciences, Inc., Montville, N.J.
No Drawing. Filed Sept. 10, 1970, Ser. No. 71,201
Int. Cl. C02b 3/08
U.S. Cl. 210—62
15 Claims

ABSTRACT OF THE DISCLOSURE

This method of maintaining a highly oxidizing aqueous solution is intended primarily for treatment of swimming pool water. A metal having a multiple valence is interacted to a lower valence with oxidizable debris in the solution, and the metal is continuously re-oxidized to a higher valence by maintaining in the water a constant excess of an oxidizer bank consisting of a salt of a peroxy acid. Silver, copper and nickel are suitable metals and their salts have germicidal properties which are greatly increased and the spectrum broadened by converting the mono salt to a divalent or trivalent salt.

BACKGROUND AND SUMMARY OF THE INVENTION

This invention relates to water treatment and compositions useful therefor. More particularly, this invention relates to treatment of swimming pool water.

In the treatment of swimming pool water, particularly in commercial type swimming pools having a capacity of several hundred thousands of gallons, elaborate and expensive equipment is employed for dispensing controlled amounts of chlorine usually as elemental chlorine, to disinfect the water and to reduce the bacteria therein. In addition, these installations have the advantage of constant supervision by trained operators.

However, single family household type swimming pools as well as small motel-hotel pools do not have the aforesaid advantages. Nothwithstanding the enormous popularity and proliferation of pools of this type, usually of modest size, elaborate chemical disinfecting equipment such as the chlorine dispensing equipment generally employed in the operation of a large commercial swimming pool is usually not employed in these smaller swimming pools for a number of reasons, such as cost, complexity of operation, and maintenance.

When it is considered that in a preponderate proportion of these homeowener and small motel pools, the problem of swimming pool operation is placed in the charge of unwilling housewives and janitors, respectively, the matter of lack of controls in the manner to be indicated becomes a matter of utmost seriousness. On the whole, such pools receive sporadic maintenance amounting to but a few minutes a day at best, while many are attended to but once or twice weekly.

The matter of precise control of the chlorination process alluded to above revolves about the well documented breakpoint reactions between chlorine and ammonia. The ammonia, derived from decomposing organic matter via bathers, vegetation and insects as well as ammonia dissolved out of the atmosphere; combines with the chlorine, thus effectively deactivating it as regards killing germs. Sufficient chlorine must be present to decompose the ammonia to nitrogen in order that highly germicidal free chlorine may exist.

$$HOCl + NH_3 \rightarrow NH_2Cl + HOH$$

The breakpoint reaction:

$$HOCl + 2NH_2Cl \rightarrow N_2 + 3HCl + HOH$$

As stated, the reaction is well known in the arts. It is also well known that chlorination short of the breakpoint will result in highly malodorous and lachrymatory reaction products that are likewise weakly germicidal: i.e., nitrogen trichloride and dichloramine.

$$HOCl + NH_2Cl \rightarrow HOH + NHCl_2 \text{ (dichloramine)}$$

$$HOCl + NHCl_2 \rightarrow HOH + NCl_3 \text{ (nitrogen trichloride)}$$

The presence of one part by weight of ammonia-nitrogen will effectively combine with 7.5 times the weight of active chlorine before permitting the achieving of the breakpoint and the establishment of an adequate germicidal residuel. These kinetics, coupled with inferior chlorine measuring devices re: orthotolidine comparators that cannot properly distinguish germicidal chlorine from obnoxious chloramine seems to condemn these "orphaned" pools to a malodorous existence as well as a potential infectious hazard to their users: the homeowners' family; the motels' patrons.

A third type swimming pool also experiences difficulties in this regard. An indoor pool, for example, has great difficulty oxidizing ammonia-nitrogen in that it is denied the photochemical rays of the sun that catalyze the breakpoint reaction. It can be understood that the formation and maintenance of odorous chloramines in an indoor environment can become an extremely objectionable by-product of swimming pool chlorination practices.

The above recitation of the existing art as regards chlorine and ammonia is intended to point up the value and pertinency of the instant invention. Whereas the previous art must suffer through the breakpoint phenomenon, which requires about 5 hours to complete in order to achieve adequate disinfection. The present invention seeks to largely avoid chloramine formation by decomposing ammonia-nitrogen via an alternate route as well as to provide benefits beyond the scope of routine chlorination.

Accordingly, it is an object of this invention to provide a superior means of disinfection in swimming pools incapable of achieving breakpoint chlorination. It is a further object to provide a system compatible with the sporadic attention received by the home type pool. It is another object to provide an inherent back-up disinfection where extremes of heat and sunlight such as experienced by small pools in southern climates render the maintenance of adequate disinfection via chlorination a virtual impossibility.

How these and other objects of this invention are accomplished will become apparent in the light of the accompanying disclosure.

DESCRIPTION OF PREFERRED EMBODIMENT

In accordance with this invention, a simple and effective method of providing safe and comfortable swimming pool water by establishing in the water to be treated an oxidizer bank compatible with chlorine comprising a peroxy type salt as, for example, sodium peroxydisulfate at a concentration ranging from 20 to 400 p.p.m., preferably about 100 p.p.m. The peroxy salt is further treated by establishing in situ a catalyst so as to render the peroxy salt both chemically reactive and highly germicidal. The catalyst can consist of trace quantities of either copper, silver or both, the copper being generally present in the concentration of 0.2 to 2.0 p.p.m., while the silver is present at a concentration of 10 p.p.b. to 100 p.p.b. The kinetics of this arrangement is such that it is reactive with ammonia-nitrogen. This is accomplished via the initial oxidation of the metal to a highly reactive trivalent form.

$$S_2O_8^= + Ag^+ \rightarrow 2SO_4^= + Ag^{+++}$$

The trivalent metal then proceeds to destroy the ammonia.

$$Ag^{+++} + NH_3 \rightarrow 3Ag^+ + N_2 + 6H^+$$

Copper behaves similarly albeit more slowly than silver.

An essential feature of the instant invention is that in order to render the reaction continuous, a large excess of peroxy salt must be present at all times in order to effect the reoxidation of reduced metal back into its effective trivalent state. Failure to maintain an excess of peroxy salt would not only stop the elimination of ammonia as previously described, but it would also result in a loss of expensive silver via complete reduction to metallic silver and consequent precipitation. The loss of silver is not nearly as troublesome as the concomitant brown discoloration and clouding of the pool water. The reduction to metallic silver occurs as follows:

$$Ag^+ + \text{organic matter} \rightarrow Ag^\circ$$

or photochemically.

$$Ag^+ + U.V. \rightarrow Ag^\circ$$

The reduction to metal is not a factor when copper is utilized; however, nevertheless as with the silver, the continuous reoxidation of copper by excess peroxy salt is essential for the efficient removal of ammonia.

(1) oxidation—$S_2O_8^= + 2Cu^{++} \rightarrow 2Cu^{+++} + 2SO_4^=$
(2) reduction—$6Cu^{+++} + 2NH_3 \rightarrow 6Cu^{++} + N_2 + 6H^+$
(3) reoxidation—regeneration via reoxidation as in step 1.

A metal other than the preferred silver and copper is nickel, for example.

$$S_2O_8^= + Ni^{++} \rightarrow Ni^{++++} + 2SO_4^=$$

Generally, what is required is a metal capable of multiple valent activity, that is, a capability of existing in at least two valency states, the higher valency of which exhibits an oxidation potential according to Latimer of preferably at least −0.40 volt in moderately alkaline aqueous systems. Other metals that can be used are iron, manganese and mercury; but silver, copper and nickel are preferred. The potential can be as low as −.15, but −.40 is preferred. All potentials referred to herein are according to Latimer.

Further equations pertinent to these are as follows:

peroxydicarbonate—$C_2O_6^= + Ag^+ \rightarrow Ag^{+++} + 2CO_3^=$
peroxydiphosphate—$P_2O_8^= + 2Ag^+ \rightarrow 2Ag^{+++} + 2PO_4^=$
peroxymonosulfate—$HSO_5^- + Ag^+ \rightarrow$
$$Ag^{+++} + SO_4^= + OH^-$$

The mono salts being more reactive are generally used at concentrations of from 5 to 50 p.p.m.

The source of the metals as used in the invention can be supplied as any convenient salt such as the nitrate or sulfate. Actually, the metals themselves can be used if they are in contact with the solution to be treated, since it would slowly corrode to a salt, but this has the disadvantage of lacking precise control. In order to prevent possible precipitation of metal from the alkaline solution, it is preferred to use a chelate such as sodium citrate for example. Other chelates are sodium acetate and ethylenediamine tetraacetic acid. Because the action of the metal is of a catalytic nature and not being of itself consumed, additions of metal can be a weekly or even monthly chore.

The peroxy salt can be added directly to the water in rather large increments, 200 p.p.m., because of its non-irritating nature. This amount can last in a pool for many weeks without further replenishment. Recharging is called for only when the level drops to 30 p.p.m. The peroxy salt is consumed via catalyzed reaction with oxidizable material and is converted to innocuous sulfate salts.

Because the peroxy salts are acidic, it is preferred to augment the alkalinity of the water by additions of effective alkaline buffers such as sodium bicarbonate, sodium sesquicarbonate and sodium carbonate.

A special feature of this invention not previously alluded to and from which numerous advantages are derivable lies in the fact that the destruction of ammonia-nitrogen as encompassed here results in the denial of an essential nutrient for organic growth. Hence, difficulties in this regard are largely avoided. As regards pool disinfection with halogens other than chlorine, the accumulation of ammonia assumes serious proportions. In the case of iodine, ammonia is not decomposed at all, and algae growths become most troublesome in such pools. Furthermore, the superior oxidation of organic debris, provided by this invention, results in a lower load on the filtration system of the pool yielding dividends as regards less maintenance in that the filters require less backwashing.

A final and most important feature of the invention is the fact that the treated solutions are highly germicidal acting over a broad bacterial spectrum. This germicidal activity is further enhanced by the catalytic effects of sunlight and also by heat. Thus, a small homeowner pool fully exposed to sun at a tepid 95° F. receives a boost with a bactericidal kill rate the equivalent of free chlorine. Thus, applicants' invention affords bactericidal activity under climatic conditions, wherein it is virtually impossible to maintain free chlorine.

Because of the stability and banking effect of the instant invention, a home pool owner can maintain a germicidal residual in his water with but one weekly feeding of the pool. Furthermore, the germicidal effect can then be stepped up by a small dosage of chlorine or other halogen immediately before swimming. Because ammonia would not be present, no irritating effects would be noticed. The results of the dual effects of halogen and catalyzed peroxy salt is to produce a greater germicidal effect, permitting lower halogen residuals to be used.

With this invention, not only the ammonia but other oxidizable organic matter is destroyed; and this permits precise dosing of the pool with halogen just prior to swimming. With the prior art, a pool which has been standing for some time without use has an unknown "halogen demand" and if the pool is dosed with halogen immediately prior to use the dose may be too much or too little, depending upon the "halogen demand." With this invention, the pool which has been standing has no "halogen demand" and the pool can be precisely dosed with halogen knowing that all of the halogen will be available as a free germicide.

Since the amount of metal required for this invention is very small, there may be enough metal in the pool water from copper plumbing or from other metal parts in contact with the water. Sufficient mercury may be available from the algicide which is used in the pool. Where metal is thus available it is sufficient to merely add a peroxy acid in order to carry out the method of this invention.

The following examples are illustrative of the practice of this invention.

EXAMPLE NO. I

A 30,000 gallon home pool under routine chlorination was analyzed to contain 2.5 p.p.m. ammonia-nitrogen. The pool was then given an initial treatment of 12 lbs. of sodium peroxydisulfate and 5 grams of silver nitrate. This treatment plus pH adjustment with 6 lbs. of sodium carbonate was repeated once every week. The peroxy residuals ranged between 15 and 70 p.p.m., averaging 50 p.p.m. After three weeks, th silver additions were stopped as the silver content in the water stabilized. Silver concentrations hovered between 20 and 40 p.p.b.

During the month of August the pool received very heavy bather activity, and two treatments were required per week. Analysis showed the initial 2.5 p.p.m. ammonia residual decreased to 0.10 p.p.m. All chlorination was stopped when peroxy treatment initially commenced, after using the peroxy treatment during the month of July the water was treated with both the chlorination and the peroxy-silver treatment.

| | Ammonia concentration, p.p.m. | Total bacteria count, number of organisms per ml. | Coliform count, number of organisms per 50 ml. |
|---|---|---|---|
| June 1-30 under chlorination | 2.50 | 69 | 3 |
| | 2.50 | 110 | 4 |
| July 1-31 under peroxy-silver with no chlorine | 0.15 | 11 | 0 |
| | 0.10 | 4 | 0 |
| | 0.15 | 22 | 1 |
| | 0.05 | 3 | 0 |
| August 1-31 under combined chlorination and peroxy-silver | 0.05 | 0 | 0 |
| | 0.10 | 0 | 0 |
| | 0.10 | 0 | 0 |

The above example shows the significant decrease in ammonia-nitrogen while also maintaining low bacterial counts. The synergistic effect of the dual bactericide, chlorine-peroxy-silver, is evident during the later part of the test.

EXAMPLE NO. II

An ammonia-nitrogen sampling was taken of several pools under chlorination, iodination and peroxy-silver. The comparative readings are quite illustrative.

| Pool | Chlorinated pools ammonia concentration, p.p.m. | Pool | Iodinated pools ammonia concentration p.p.m. | Pool | Peroxy-silver pools ammonia concentration, p.p.m. |
|---|---|---|---|---|---|
| A | 0.25 | I | 0.30 | Q | 0.07 |
| B | 0.24 | J | 3.00 | R | 0.15 |
| C | 2.50 | K | 0.80 | S | 0.10 |
| D | 2.56 | L | 0.40 | T | 0.05 |
| E | 0.15 | M | 1.00 | U | 0.20 |
| F | 0.22 | N | 3.10 | V | 0.10 |
| G | 1.20 | O | 0.70 | W | 0.15 |
| H | 1.10 | P | 0.50 | X | 0.10 |
| Avg | 1.03 | Avg | 1.22 | Avg | 0.12 |

The peroxy readings are significantly lower.

EXAMPLE NO. III

The synergistic effect of the dual bactericide peroxy-metal-halogen noted above (Example I) in the instance of chlorine has been established to be effective in the instance of iodine.

| Concentration of iodine at pH 7.8 | Faecal strep test organism survival counts per ml. after— | | | |
|---|---|---|---|---|
| | 0 seconds | 30 seconds | 1 minute | 2 minutes |
| 0.7 p.p.m. iodine alone | 270,000 | 110,000 | 2,800 | 10 |
| 0.7 p.p.m. iodine with peroxy-copper bank in sunlight | 270,000 | 88,000 | 32 | 0 |

The peroxy salt used here was peroxydisulfate at a concentration of 40 p.p.m., while the metal was copper at 0.2 p.p.m. The effect of sunlight was also used in this instance.

EXAMPLE NO. IV

In this instance a small 5,000 gallon above-ground pool containing warm water at 85° F. exposed to full sun was treated with a peroxy salt (peroxydisulfate) and both silver and copper salts were added. The peroxy salt was maintained at between 100 and 200 p.p.m., the silver between 20 and 100 p.p.b., the copper between 0.2 to 0.8 p.p.m. The number of bathers entering the pool averaged between 3 and 11 per day. The pH was maintained between 7.2 and 8.1. Free halogen was not added at anytime.

The bacteriological sampling of the water at various times during active bather use produced the following results:

| Bather load in 5,000 gallons | Standard total plate count filter membrane method (1 ml.) | Coliform count filter membrane method (50 ml.) | Peroxy content, p.p.m. |
|---|---|---|---|
| 11 | 143 | 0 | 185 |
| 9 | 41 | 0 | 205 |
| 9 | 18 | 0 | 205 |
| 9 | 23 | 0 | 205 |
| 9 | 13 | 0 | 205 |
| 9 | 9 | 0 | 205 |
| 9 | 8 | 0 | 205 |
| 9 | 8 | 0 | 205 |
| 9 | 7 | 0 | 205 |
| 8 | 72 | 1 | 62 |
| 8 | 165 | 0 | 62 |
| 8 | 84 | 0 | 62 |
| 8 | 43 | 0 | 62 |

The above results all lie within the U.S.P.H.S. requirements of less than 200 organisms on the total count and less than 1 on the coliform index. The heavy use of the pool required a once daily feeding schedule. Bather complaints were at a minimum.

Other uses incident to this invention are treatments for decorative fountains and sanitizing rinses.

What is claimed is:

1. The method of maintaining a highly oxidizing alkaline aqueous solution which comprises maintaining distributed through the water a metal at a multiple valence, interacting the metal to a lower valence with oxidizable debris including ammonia which may be present in the solution, restoring the metal to a higher valence sufficient to impart to the solution an oxidizing potential of at least −0.15 volt, and preventing complete reduction and consequent precipitation of the metal.

2. The method described in claim 1 characterized by preventing complete reduction of metal by continually reoxidizing the metal to a higher valence by maintaining in the water a constant excess of an oxidizer bank consisting of a salt of a peroxy acid, and making periodic additions of said salt to the solution.

3. The method described in claim 1 characterized by the metal being from the group consisting of silver, copper and nickel, the concentration of the metal in the solution being between 0.01 p.p.m. and 2.00 p.p.m.

4. The method described in claim 1 characterized by maintaining in the water a soluble salt of a metal in a multi-valent state, the higher valence of which can impart to the water the oxidation potential of at least −0.15 volt in an alkaline solution having a pH between 6.5 and 9.

5. The method described in claim 4 characterized by the metal salt being from the group consisting of a nitrate, sulfate, chloride and oxide.

6. The method described in claim 2 characterized by treating the water concomitantly at least part of the time, with available halogen, and using an oxidizing bank that is compatible with the halogen.

7. The method described in claim 2 characterized by using an oxidizing bank that is compatible with available chlorine, and treating the aqueous solution at least intermittently with available chlorine.

8. The method described in claim 2 characterized by the peroxy salt being from the group consisting of peroxydisulfuric acid, peroxymonosulfuric acid, peroxydicarbonic acid, peroxymonocarbonic acid, peroxydiphosphoric acid and peroxymonophosphoric acid.

9. The method described in claim 2 characterized by maintaining the highly oxidizing aqueous solution by establishing a constant excess of the oxidizer bank consisting of the peroxy acid salt with the metal of a multiple valence, the higher valence of which can impart to the water an oxidation potential of at least −0.40 volt in moderately alkaline solutions of a pH between 6.5 and 9 with the concentration of metal established therein between 0.01 p.p.m. and 2.00 p.p.m.

10. The method described in claim 1 characterized by the method being used to obtain germicidal action in the water of a swimming pool, distributing silver as the metal with the silver in a soluble salt of silver, distributing through the water of the pool a peroxy acid salt from the group consisting of alkali and alkaline earth salts, the silver being oxidized by the peroxy salt to a higher valent form which destroys the ammonia and oxidizable debris in the pool water with resulting reduction of the silver, maintaining in the water a constant excess of the peroxy salt that reoxidizes the silver to its higher valence, and by the re-oxidizing action of the peroxy salt preventing the silver from being completely reduced with consequent precipitation.

11. The method described in claim 10 characterized by augmenting the alkalinity of the water to a pH of between 6.5 and 9 by the addition of effective alkaline buffers from the group consisting of sodium bicarbonate, sodium sesquicarbonate and sodium carbonate, and using a chelant in the water as a precaution against possible precipitation of metal from the solution.

12. The method described in claim 10 characterized by adding to the water of the pool the peroxy salt in an amount as high as 200 p.p.m. and recharging the pool before the level drops below 30 p.p.m., maintaining the peroxy salt and the silver in the pool continuously and using salts that are compatible with available chlorine, and intermittently supplementing the germicidal effect of the peroxy salt and silver by adding available chlorine to the pool.

13. The method described in claim 1 characterized by the method being used to obtain germicidal action in the water of a swimming pool, distributing as the metal in the pool a metal from the group consisting of silver, copper and nickel, distributing through the water in the pool a peroxy acid salt from the group consisting of alkali and alkaline earth salts, the metal being oxidized by the peroxy salt to a higher valent form which destroys the ammonia and oxidizable debris in the pool water with resulting reduction of the metal, maintaining in the water a constant excess of the peroxy salt that re-oxidizes the metal to its higher valence, and by the re-oxidizing action of the peroxy salt preventing the metal from being completely reduced with consequent precipitation.

14. The method described in claim 13 characterized by the metal being from the group consisting of silver, copper, nickel, iron, manganese and mercury.

15. The method described in claim 2 characterized by treating a halogenated water at least part of the time with an excess of an oxidizer bank consisting of the salt of a peroxy acid and utilizing at multiple valence trace copper occurring naturally in the water, and where trace copper present is below 0.2 p.p.m., adding additional copper to the solution.

References Cited
UNITED STATES PATENTS

| | | | |
|---|---|---|---|
| 3,329,607 | 7/1967 | Colobert et al. | 210—64 X |
| 3,232,869 | 2/1966 | Gard | 210—64 X |
| 3,189,518 | 6/1965 | Glasgow | 210—64 X |
| 3,350,265 | 10/1967 | Rubinstein et al. | 424—130 X |
| 3,248,281 | 4/1966 | Goodenough | 424—130 |
| 3,510,424 | 5/1970 | Zumbrunn | 210—63 |

REUBEN FRIEDMAN, Primary Examiner

T. G. WYSE, Assistant Examiner

U.S. Cl. X.R.

210—63, 64; 424—130